April 24, 1928.

C. H. PEIRSON ET AL 1,667,673

MOLDING MACHINE

Filed Aug. 12, 1926

Inventors:-
Charles H. Peirson,
William A. Bohne.
by their Attorneys.
Howson & Howson April 24, 1928.  
C. H. PEIRSON ET AL  
1,667,673
MOLDING MACHINE
Filed Aug. 12, 1926    3 Sheets-Sheet 2
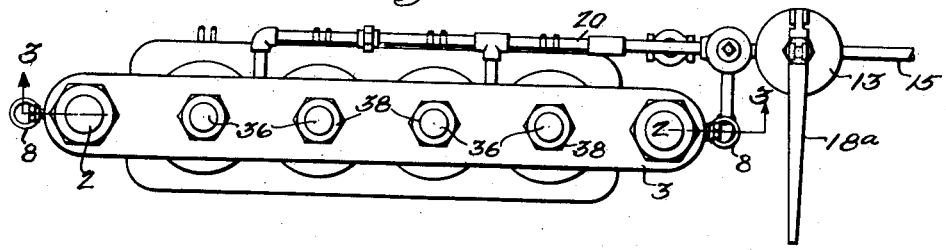
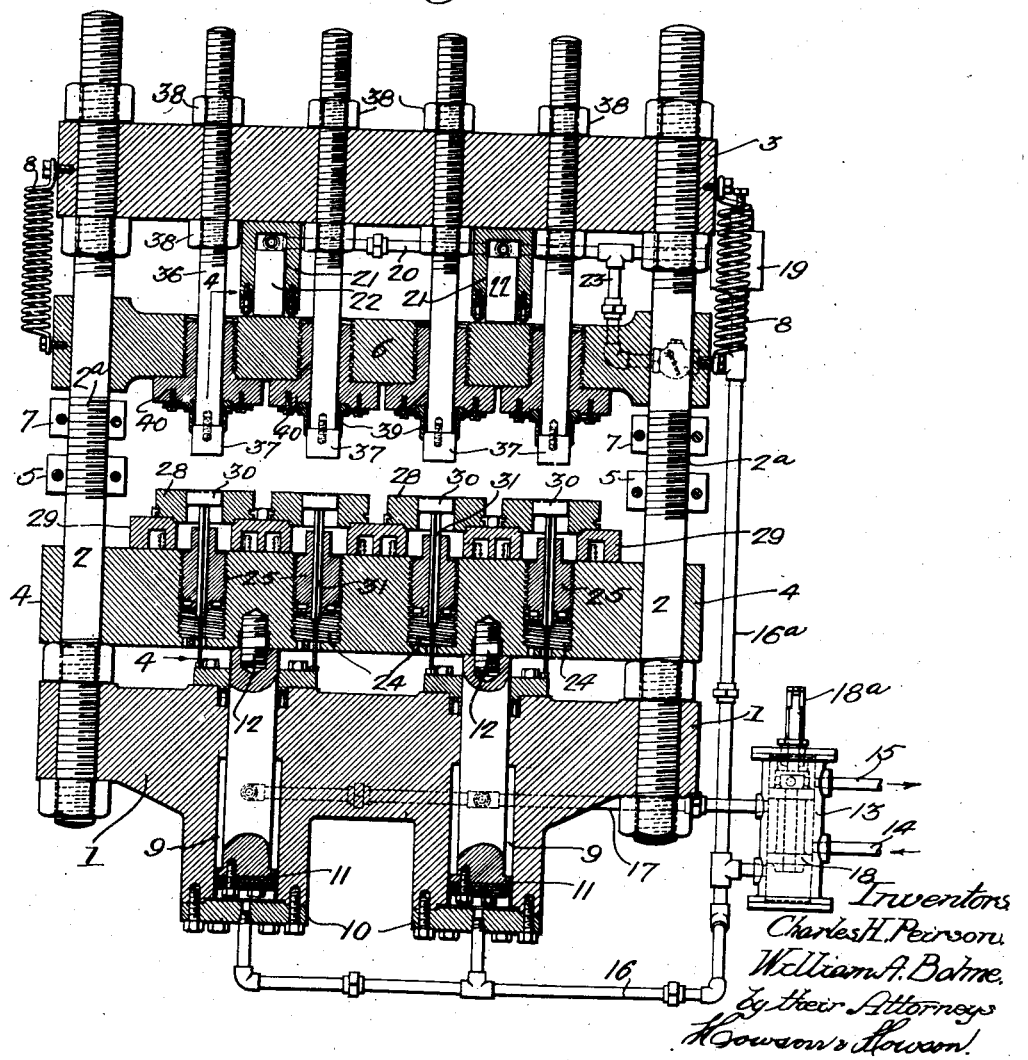

April 24, 1928.　　　　　　　　　　　　　　　　　1,667,673
C. H. PEIRSON ET AL
MOLDING MACHINE
Filed Aug. 12, 1926　　　　　3 Sheets-Sheet 3
Fig.4.
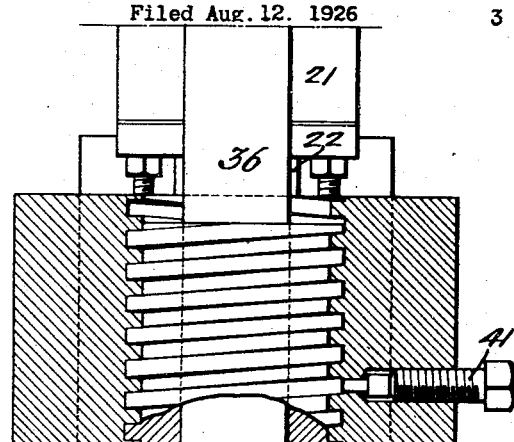
Fig.5.
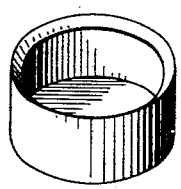
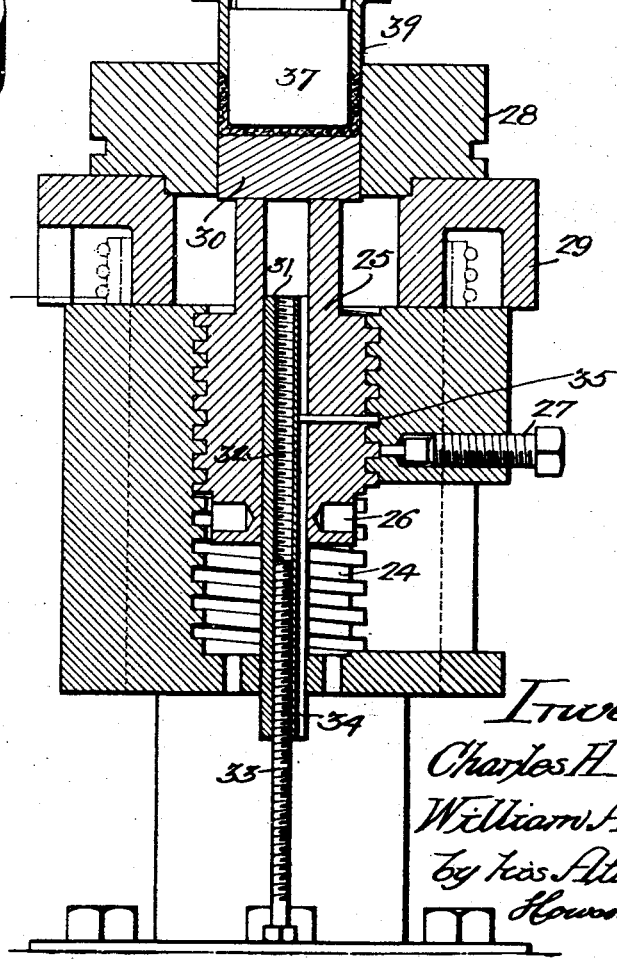
Inventors:
Charles H. Peirson,
William A. Bohne,
by their Attorneys.

Patented Apr. 24, 1928.

1,667,673

UNITED STATES PATENT OFFICE.

CHARLES H. PEIRSON AND WILLIAM A. BOHNE, OF PHILADELPHIA, PENNSYLVANIA, ASSIGNORS TO E. F. HOUGHTON & COMPANY, OF PHILADELPHIA, PENNSYLVANIA, A CORPORATION OF PENNSYLVANIA.

MOLDING MACHINE.

Application filed August 12, 1926. Serial No. 128,828.

This invention relates to certain improvements in machines for molding or forming cups of leather or similar material.

The object of the invention is to make a power molding machine in which a number of leather cups can be shaped and formed by a single operation. The invention also relates to certain details of construction which will be described hereinafter.

In the accompanying drawings:

Fig. 2 is a plan view;

Fig. 3 is a sectional elevation on the line 3—3, Fig. 2;

Fig. 4 is an enlarged sectional view showing the upper and lower dies with a molded cup in position; and Fig. 5 is a perspective view of one of the formed cups.

Figure 1:
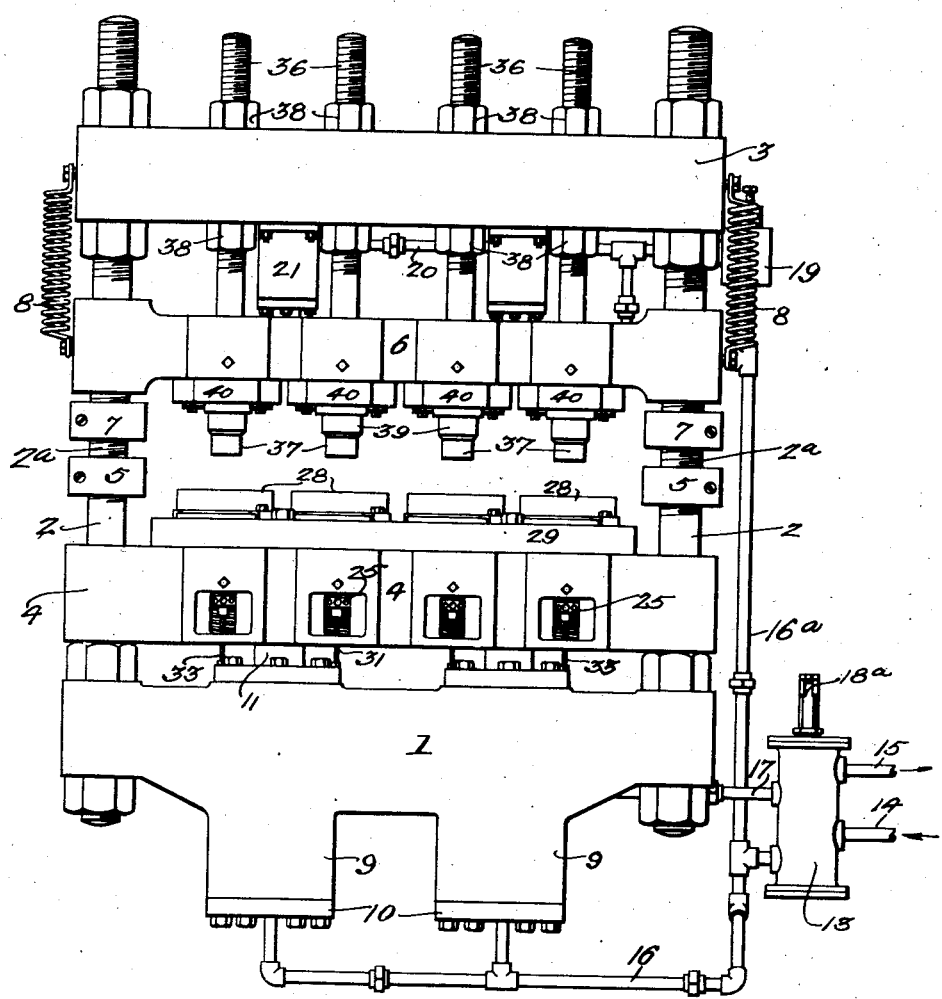
Figure 1 is a front elevation of our improved cup molding machine.

The lower housing 1 of the molding press is connected by heavy rods to the upper housing 3. The rods are threaded at each end and nuts adjustably hold the rods to the housings.

The lower die carrier 4 is mounted on the rods 2, and has a limited vertical movement on said rods. Stops 5 are mounted on the threaded portions 2ᵃ of the rod which can be clamped in position after adjustment.

The upper die carrier 6 is also mounted on the rods 2 and has a limited downward movement toward the lower die. Stops 7 on the rod similar to the stops 5 limit the downward movement of the upper die carrier.

The upper die carrier 6 is held in the elevated position by springs 8 located in each side of the machine as shown in Fig. 1.

In the lower housing 1 are two hydraulic cylinders 9 in the present instance, having caps 10. Within the cylinders 9 are plungers 11 having reduced portions and provided with cups at their lower ends. The upper end of the plungers extends through suitable packing glands. The plungers 11 are attached to the under side of the lower die carrier by screw studs 12 as shown in Fig. 3.

A valve casing 13 is connected to a pressure device by a pipe 14 and to exhaust by a pipe 15. The casing is also connected to the bottom of the two cylinders 9—9 by a pipe 16 and connected to the space formed by the reduced portions of the plungers by a pipe 17 forming a pull back. Within the casing is a four-way valve 18 controlling the ports of the casing and actuable by a lever 18ᵃ.

On operating the valve 18 fluid under pressure can be admitted to the space under the plungers to raise the plungers and the lower die carrier or admitted through the pipe 17 to withdraw the die carrier and the plungers.

A pipe 16ᵃ forms a continuation of the pipe 16 and is connected to a valve casing 19 at the upper end of the machine. In this casing is a pressure valve which is opened when the lower die carrier comes in contact with the stops 5 allowing fluid to pass from the pipe 16ᵃ through a pipe 20 to the upper ends of cylinders 21 secured to the underside of the upper housing 3 causing the plungers 22 within the cylinders to force the upper die carrier 5 down against the pressure of the springs 8 until the carrier comes in contact with the stops 7.

A by-pass pipe 23 is connected to the pipes 16ᵃ and 20 by passing the pressure valve. In the pipe 23 is a check valve which prevents fluid under pressure passing from the pipe 16ᵃ to the pipe 20 without passing through the pressure valve, but allowing fluid to pass from the pipe 20 to the pipe 16ᵃ and to exhaust.

In the lower die carrier 4 are a series of threaded openings 24 closed at the bottom with the exception of small holes and open at one side.

In the openings are threaded stops 25 which regulate the depth of the base of the lower die. The stops have spanner holes 26 for the reception of a tool passed through the side openings in the lower die carrier, shown clearly in Fig. 4.

The stops are held in position after adjustment by set screws 27.

The lower dies 28 are clamped to a casting or heating plate 29, secured to the lower die carrier 4, and within each lower die is a disk 30 forming the bottom of the die. The disk rests upon the reduced end of the stop 25 when the cup is being molded but is raised off at the stop by an adjustable ejecting pin 31 when the lower die carrier is lowered as in Fig. 3. This ejecting pin has an internally threaded tubular portion 32 and a threaded stem 33 having a head which rests upon the packing glands of the lower housings. The portion 32 has a longitudinal slot 34 to receive a pin 35 which extends from the stop 25 and prevents the portion 32 of the ejector turning in the stop.

Secured to the upper housing 3 are a series of stems 36 carrying at their lower ends the upper dies 37 for pressing the leather or other material into the lower dies to form cups. These stems are threaded and extend through the upper housing and are provided with adjusting nuts 38 above and below the housing.

Surrounding the upper dies 37 are cylindrical dies 39 clamped to carrier 40 having threaded portions screwed into threaded openings in the upper die carrier 6. These carriers are vertically adjustable in the die carrier and are held in the position in which they are adjusted by set screws 41.

By the means above described the cylindrical dies 39 can be adjusted to regulate the depth of the walls of the cups. The lower edges of the cylindrical dies are beveled as shown in Fig. 4 to form a beveled edge of the cup.

The operation is as follows after the parts have been adjusted to form cups of a given size:

The leather sections are placed in the lower dies. The four-way valve is operated to admit fluid under pressure to the cylinders 9 under the plungers 11 causing the lower die carrier to raise until it comes in contact with the stops 5. As the upper dies 37 are fixed they force the leather into the lower dies pushing the disks 30 until they come into contact with the stops 25. As soon as the lower die carrier stops then the fluid operates the pressure valve 19 and flows through the pipe 20 to the upper ends of the cylinders 21 causing the plungers 22 to depress the upper die carrier forcing the cylindrical edge dies 39 into the lower dies and compressing the edges of the leather cups and forming the bevel at the edges. When the four-way valve 18 is moved to bring the exhaust ports in communication with the pipe 16—16ª the upper die carrier is raised by its springs, and the lower die has a tendency to descend by its own weight. To insure its returning to its first position, however, fluid under pressure is directed through the pipe 17 into the cylinders 9 above the lower effective end of the plungers which positively forces the plungers down.

We claim:

1. The combination in a machine for molding cups of leather and like material, of a fixed die; a movable die for forming a cup around the fixed die; a second movable die cylindrical in form and arranged to press the edge of the cup to size; a stop to limit the movement of the first movable die; fluid pressure mechanisms for said movable dies; a valve for controlling the flow of an actuating fluid to said mechanisms; and a pressure valve in the line leading to the fluid pressure mechanism of said second movable die adapted to be operated automatically by increased pressure when the cup-forming movement of the first movable die is interrupted by the stop, whereby the second movable die will be actuated to compress the edges of the cup to size.

2. The combination in a machine for molding cups of leather or similar material, of an upper and lower housing; means for connecting the housings; a series of fixed dies projecting from the upper housing; power cylinders in the lower housing; means for supplying fluid under pressure to the cylinders; plungers in the cylinders; a lower die carrier attached to the plungers; a series of dies mounted on the carrier; power cylinders in the upper housing; plungers in said cylinders; an upper die carrier, through which the fixed dies extend, attached to said plungers; cylindrical dies carried by the upper die carrier and surrounding the fixed dies; means for supplying fluid under pressure to all the cylinders including a valve for controlling the actuating fluid; and stops to limit the movement of the carriers, the said valve being so arranged that when the lower die carrier has been raised to form cups over the fixed dies, the upper die carrier is actuated by the fluid pressure to cause the cylindrical dies to press the edges of the cups to size.

3. The combination in a machine for molding cups of leather or similar material of a lower housing having cylinders therein; an upper housing connected to the lower housing; fixed upper dies depending from the said upper housing; a lower die carrier; plungers in the cylinders of the lower housing attached to the lower die carrier; dies on said carrier; a series of adjustable stops in the lower die carrier directly under the dies; a disk normally resting on the stops and forming the bottom of the dies; an ejector for raising the disk and discharging the cups when the die carrier is lowered; an upper die carrier; a spring for supporting the said die carrier; cylinders secured to the upper housing; plungers in the cylinders bearing against the upper die carrier; cylindrical dies on the upper die carrier surrounding the fixed upper dies; stops to limit the movement of the upper and lower die carriers; piping connecting the two sets of cylinders for admitting fluid under pressure; and valve means for controlling the flow of fluid.

4. The combination of a lower housing and an upper housing; rods connecting the housings; a lower die carrier and an upper die carrier; springs supporting the upper die carrier; a cylinder in the lower housing; a plunger attached to the lower die carrier and extending into the cylinder; a plate on the lower die carrier and a lower die carried thereby; an adjustable stop in the die carrier; a loose disk mounted on the stop when the cup is being formed; means for raising the disk when the die carrier is lowered to eject the formed cup; a fixed upper die carried by the upper housing; a cylindrical die carried by the upper die carrier arranged to enter the lower die after the lower die has been raised; a cylinder in the upper housing; a plunger in the cylinder bearing against the upper die carrier; and means for admitting fluid under pressure to the cylinders, to cause the die carriers to move towards each other and form cups.

5. The combination of a lower housing and an upper housing; rods connecting the housings; a lower die carrier and an upper die carrier; springs supporting the upper die carrier; a cylinder in the lower housing; a plunger attached to the lower die carrier and extending into the cylinder; a heating plate on the lower die carrier and a lower die carried thereby; an adjustable stop in the die carrier; a loose disk mounted on the stop when the cup is being formed; means for raising the disk when the die carrier is lowered to eject the formed cup; a fixed upper die carried by the upper housing; a cylindrical die carried by the upper die carrier arranged to enter the lower die after the lower die has been raised; a cylinder in the upper housing; a plunger in the cylinder bearing against the upper die carrier; means for admitting fluid under pressure to the cylinders to cause the die carriers to move toward each other and form cups; a valve controlling the flow of fluid to the two cylinders; and a pressure valve in the line leading to the upper cylinders, actuated when the lower die carrier has come to rest.

6. The combination of a lower housing and an upper housing; side rods adjustably connecting the housings; a lower die carrier and an upper die carrier mounted on the rods; stops on the rods for limiting the movement of the two carriers; springs for maintaining the upper die carrier in raised position; cylinders in the lower housing; plungers attached to the lower die carrier and located in the cylinders; cylinders secured to the upper housing; plungers in the cylinders bearing against the upper die carrier; a heating plate mounted on the lower die carrier; lower dies secured to the heating plate; movable disks in the lower die carriers and forming bottoms thereof; threaded stops mounted in threaded openings in the lower die carrier and arranged to support the disks when pressure is applied; ejectors extending through the stops for raising the disks and formed cups; upper fixed dies adjustably mounted in the upper housing and extending through the upper die carrier; adjustable die supports mounted in the carrier; cylindrical dies secured to the supports and encircling the fixed dies; piping and a control valve for controlling the fluid leading to the cylinders; and a pressure valve in the line leading to the upper cylinders, so that when the lower die carrier is raised and forms the cups over the fixed upper dies and comes to a stop, the fluid under pressure will then actuate the upper plungers and force the upper die carrier toward the lower die carrier, the upper cylindrical dies entering the lower dies and acting to compress the edges of the cups.

CHARLES H. PEIRSON.
W. A. BOHNE.